(12) United States Patent
Parantainen et al.

(10) Patent No.: US 6,795,419 B2
(45) Date of Patent: Sep. 21, 2004

(54) WIRELESS TELECOMMUNICATIONS SYSTEM USING MULTISLOT CHANNEL ALLOCATION FOR MULTIMEDIA BROADCAST/MULTICAST SERVICE

(75) Inventors: Janne J Parantainen, Helsinki (FI); Harri Jokinen, Hiisi (FI); Arto Leppisaari, Kangasala (FI)

(73) Assignee: Nokia Corporation, Espoo (FI)

( * ) Notice: Subject to any disclaimer, the term of this patent is extended or adjusted under 35 U.S.C. 154(b) by 228 days.

(21) Appl. No.: 10/098,883

(22) Filed: Mar. 13, 2002

(65) Prior Publication Data

US 2003/0174645 A1 Sep. 18, 2003

(51) Int. Cl.[7] .............................................. H04B 7/212
(52) U.S. Cl. ........................ 370/337; 370/347; 370/468
(58) Field of Search ................................. 370/329, 330, 370/336, 337, 341, 348, 349, 311, 347, 468; 455/450, 455, 509

(56) References Cited

U.S. PATENT DOCUMENTS

| | | | | |
|---|---|---|---|---|
| 5,228,029 A | * | 7/1993 | Kotzin | 370/331 |
| 5,574,996 A | * | 11/1996 | Raith | 455/161.3 |
| 6,031,832 A | * | 2/2000 | Turina | 370/348 |
| 6,122,293 A | | 9/2000 | Frodigh et al. | 370/473 |
| 6,333,919 B2 | * | 12/2001 | Gaffney | 370/254 |
| 6,359,877 B1 | * | 3/2002 | Rathonyi et al. | 370/349 |
| 6,400,954 B1 | | 6/2002 | Khan et al. | 455/450 |
| 2001/0017849 A1 | * | 8/2001 | Campanella et al. | 370/326 |

OTHER PUBLICATIONS

3GPP TR21.905, V4.4.0 (Oct. 2001), Third Generation Partnership Project; Technical Specification Group Services and System Aspects; Vocabulary for 3GPP Specifications (Release 4).

\* cited by examiner

Primary Examiner—Chau Nguyen
Assistant Examiner—Soon-Dong Hyun
(74) Attorney, Agent, or Firm—Harrington & Smith, LLP (57) ABSTRACT

A method is disclosed for operating a wireless telecommunication system for providing a Multimedia Broadcast/Multicast Service MBMS broadcast transmission from a network operator (10) to a mobile station (100). A first step determines a minimum bit rate requirement to broadcast a MBMS message and a number of radio blocks per time period that are required to satisfy the bit rate requirement. A second step allocates the determined number of radio blocks in accordance with a multislot transmission technique, wherein a plurality of time slots are used per frame, such that the mobile station is provided with at least one idle radio block between two active MBMS transmission periods. The at least one idle radio block may occur between two active MBMS radio blocks. A third step transmits the determined radio block allocation to the mobile station. In the preferred embodiment the step of determining may include a consideration of radio channel conditions and a multislot class of the mobile station. In one embodiment the step of allocating attempts to maximize the number of idle radio blocks and the mobile station, during the idle radio block, performs at least one of entering a reduced power consumption mode of operation, or entering a neighbor channel measurement mode of operation. In another embodiment the step of allocating allocates radio blocks so as to complete the data transmission within the shortest period of time.

26 Claims, 4 Drawing Sheets

WIRELESS TELECOMMUNICATIONS SYSTEM USING MULTISLOT CHANNEL ALLOCATION FOR MULTIMEDIA BROADCAST/MULTICAST SERVICE

TECHNICAL FIELD

These teachings relate generally to wireless telecommunication systems, including both fixed network and mobile user devices, and to an emerging function known generally as the Multimedia Broadcast/Multicast Service (MBMS).

BACKGROUND

The following abbreviations are herewith defined.

| | |
|---|---|
| 3GPP ™ | Third Generation (cellular system) Partnership Project |
| BSC | Base Station Controller |
| BTS | Base Transceiver Station |
| CBCH | Cell Broadcast Channel |
| DL | Down Link (to the MS) |
| EDGE | Enhanced Data rate for Global Evolution |
| EGPRS | Enhanced General Packet Radio Service |
| GERAN | GSM/EDGE Radio Access Network |
| GPRS | General Packet Radio Service |
| GSM | Global System for Mobile Communications |
| MBMS | Multimedia Broadcast/Multicast Service |
| MS | Mobile Station |
| PACCH | Packet Associated Control Channel |
| PCCCH | Packet Common Control Channel |
| PDCH | Packet Data Channel |
| RAN | Radio Access Network |
| SGSN | Serving GPRS Support Node |
| TDMA | Time Division Multiple Access |
| UL | Uplink (from the MS) |

Reference can also be made to 3GPP TR21.905, V4.4.0 (2001-10), Third Generation Partnership Project; Technical Specification Group Services and System Aspects; Vocabulary for 3GPP Specifications (Release 4).

Figure 1:
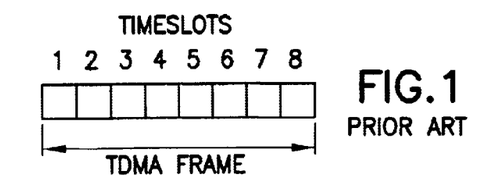
FIG. 1 illustrates a conventional TDMA frame.
Figure 2:
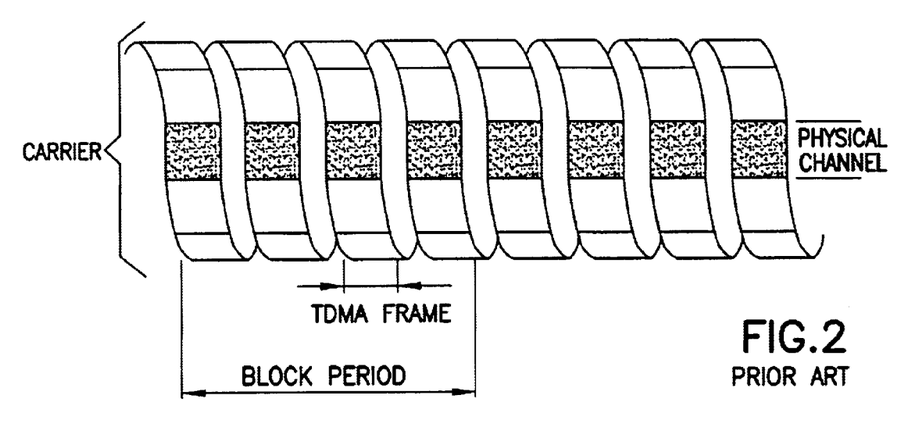
FIG. 2 illustrates a conventional physical channel in the TDMA frame structure.

Referring to FIG. 1 by way of introduction, in conventional TDMA systems one frame is divided into time slots (TSs). In the case of GSM/GPRS there are eight time slots per frame (TS1–TS8). FIG. 2 illustrates the manner in which a physical channel (i.e., one RF channel operating at a defined carrier frequency) constitutes a series of time slots in consecutive TDMA frames. A plurality of TDMA frames, such as four, constitutes one block.

In (E)GPRS data is transferred in blocks (also referred to as radio blocks) each containing four block-interleaved bursts (one burst per time slot per frame). These blocks can carry varying amounts of information depending on the modulation and coding scheme that is used. Information from several logical channels, e.g., PDCH, PCCCH, PACCH, and so forth can be multiplexed into one physical channel. In other words one block can contain a PDCH block, the next PCCCH block and so on. It is also possible to multiplex several different users into one PDCH.

It is known in the art to provide for so-called multislot operation. More particularly, in order to support a specific data rate for some defined service the wireless network can allocate two or more physical channels (time slots) in parallel and allocate all or part of the radio blocks of the physical channel for the service. In this way the network can provide the required bit rates in a flexible manner.

MBMS is an emerging new service that is intended to provide enhanced functionality for advanced wireless communication systems, in particular the 3GPP™ and similar types of networks. With MBMS it will be possible for MSs to receive both text and video data (e.g., video broadcasting).

However, a problem has arisen in that when allocated to a given physical channel for MBMS operation the MS can consume power in a substantially continuous manner, thereby shortening battery life and reducing the time between required rechargings of the battery. Furthermore, the MS is typically required to periodically perform certain non-communication related functions, such as making channel measurements from neighboring cells. In order to still perform these required functions it may be necessary to temporarily interrupt the reception of data from the MBMS service, which could be objectionable to the user.

Figure 3:
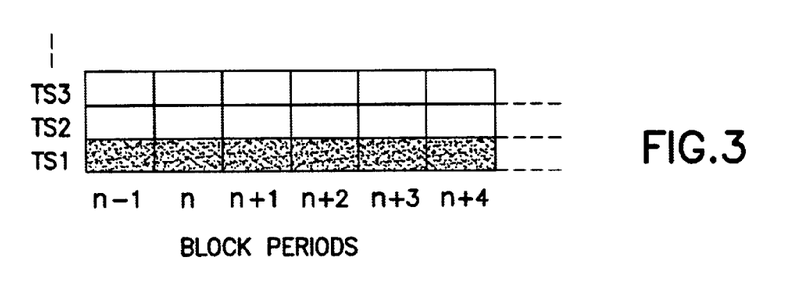
FIG. 3 shows a plurality of continuous block periods on one physical channel allocated to the MS for receiving MBMS traffic.

FIG. 3 shows a case where all blocks in one physical channel (e.g., assuming the use of TS1) would be allocated for receiving the MBMS service at the MS. As is shown, the MS can be receiving MBMS services for relatively long periods of time, and such continuous reception of radio blocks consumes significantly more battery power than would be consumed if periodic reception were used. In the illustrated case the use of the MS low power consumption mode is not possible in the short time period between received bursts of consecutive TDMA frames within each radio block, it being remembered from above that each radio block contains four block-interleaved bursts (one burst per time slot per frame).

SUMMARY OF THE PREFERRED EMBODIMENTS

The foregoing and other problems are overcome, and other advantages are realized, in accordance with the presently preferred embodiments of these teachings.

The teachings in accordance with this invention provide an optimal or near optimal use of multislot channel allocation for MBMS in GERAN and other wireless networks that use time slotted radio communication channels.

A method is provided for allocating blocks for a MBMS channel based on the MS multislot class and on a required MBMS service bit rate. In accordance with this invention multislot transmission is used so as to both satisfy the required bit rate of the MBMS service and to reduce or minimize the MS power consumption. By allocating several time slots in parallel to one block, and by providing an idle period between allocated blocks, the MS is enabled to switch to a lower power consumption mode (e.g., enter the sleep mode), or alternatively the MS is enabled to perform system information decoding or neighbor cell monitoring) functions. This method overcomes the power consumption and other problems that result from an allocation of one channel continuously for MBMS service reception purposes.

The method allows the network to minimize the mobile station's battery consumption by utilizing multislot reception. This is beneficial, as the MS can be receiving MBMS services for relatively long periods of time, and the continuous reception of radio blocks consumes significantly more battery power as compared to periodic reception. When the periodic reception mode is used the MS can transition to the lower power consumption mode for those times when the MBMS messages (or normal paging blocks) are not scheduled to be received by the MS.

A method of this invention is directed to operating a wireless telecommunication system for providing a MBMS broadcast transmission from a network operator to a mobile station. A first step determines a minimum bit rate requirement to broadcast a MBMS message and a number of radio blocks per time period that are required to satisfy the bit rate requirement. A second step allocates the determined number of radio blocks in accordance with a multislot transmission technique, wherein a plurality of time slots are used per frame, such that the mobile station is provided with at least one idle radio block between two active transmission periods, and may be provided with at least one idle radio block between two active (MBMS) radio blocks. A third step transmits the determined radio block allocation to the mobile station. In the preferred embodiment the step of determining may include a consideration of radio channel conditions and a multislot class of the mobile station.

In one embodiment the step of allocating attempts to maximize the number of idle radio blocks and the mobile station, in response to an occurrence of the at least one idle radio block, performs at least one of entering a reduced power consumption mode of operation during the at least one idle radio block or entering a neighbor cell measurement mode of operation during the at least one idle radio block, while in another embodiment the step of allocating allocates radio blocks so as to complete the data transmission within the shortest period of time.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figure 7:
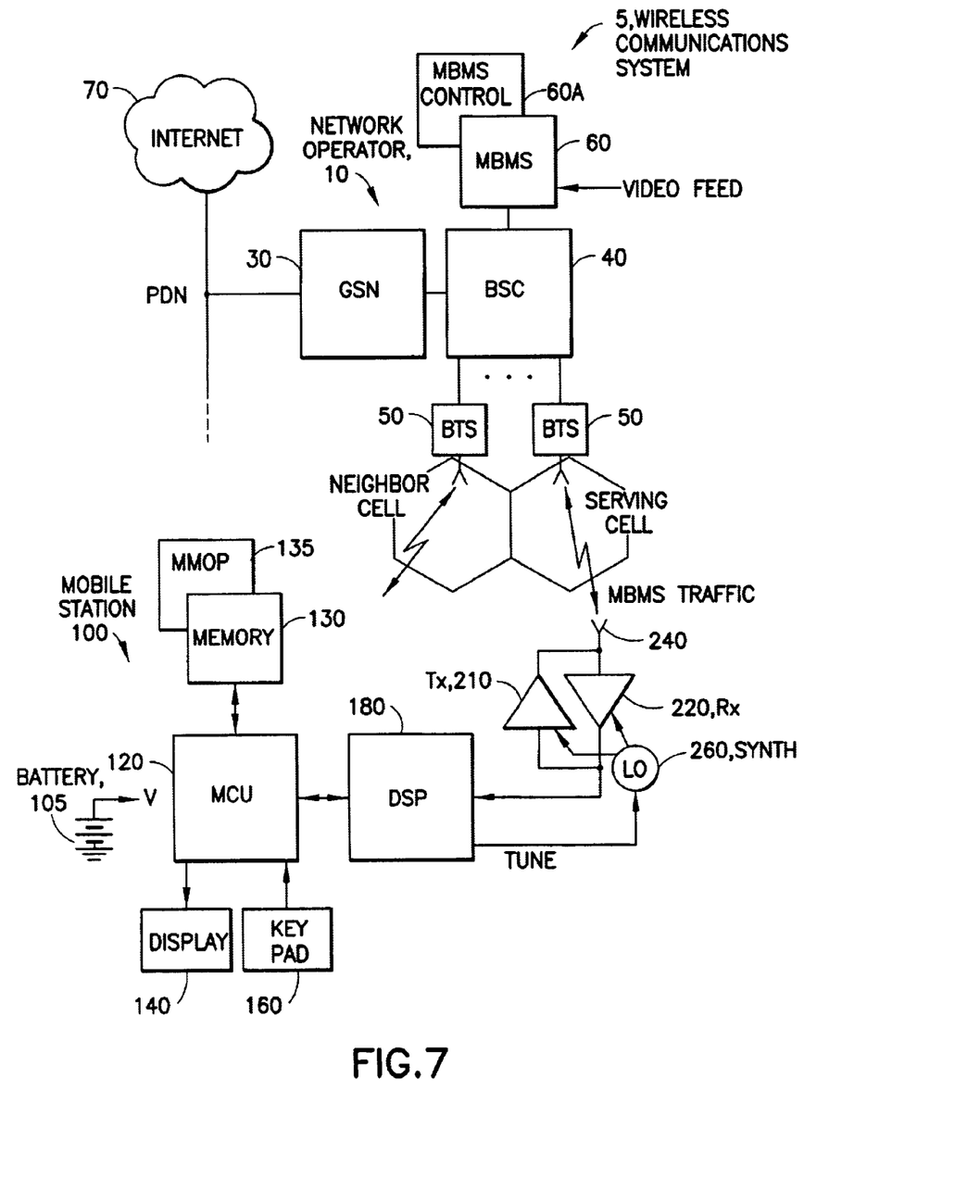
FIG. 7 is a system level block diagram of a wireless telecommunication system that is suitable for practicing this invention.

Referring first to FIG. 7, there is illustrated a simplified block diagram of an embodiment of a wireless telecommunication system 5 that is suitable for practicing this invention. The wireless telecommunication system 5 includes at least one mobile station (MS) 100. FIG. 7 also shows an exemplary network operator having, for example, a GPRS Support Node (GSN) 30 for connecting to a telecommunications network, such as a Public Packet Data Network or PDN, at least one base station controller (BSC) 40, and a plurality of base transceiver stations (BTS) 50 that transmit in a forward or downlink direction both physical and logical channels to the mobile station 100 in accordance with a predetermined air interface standard. A reverse or uplink communication path also exists from the mobile station 100 to the network operator, which conveys mobile originated access requests and traffic.

The air interface standard can conform to any suitable standard or protocol, and may enable both voice and data traffic, such as data traffic enabling Internet 70 access and web page downloads. In the presently preferred embodiment of this invention the air interface standard is a Time Division Multiple Access (TDMA) air interface that supports a GSM or an advanced GSM protocol and air interface, in particular an air interface compatible with the MBMS services in accordance with current and future embodiments of 3GPP™ and the GSM/EDGE Radio Access network. These teachings are not, however, intended to be limited to only these particular types of wireless communications systems.

The network operator is assumed to include or to be coupled to a Multimedia broadcast/Multicast Service (MBMS) functional block 60 that may receive, either directly or indirectly, a video feed and/or other sources of broadcast information for transmission to MBMS-compatible mobile stations 100.

The mobile station 100 is powered at least some of the time by a battery 105, and typically includes a microcontrol unit (MCU) 120 having an output coupled to an input of a display 140 and an input coupled to an output of a keyboard or keypad 160. The mobile station 100 may be a handheld radiotelephone, such as a cellular telephone or a personal communicator. The mobile station 100 could also be contained within a card or module that is connected during use to another device. For example, the mobile station 10 could be contained within a PCMCIA or similar type of card or module that is installed during use within a portable data processor, such as a laptop or notebook computer, or even a computer that is wearable by the user.

The MCU 120 is assumed to include or be coupled to some type of a memory 130, including a read-only memory (ROM) for storing an operating program, as well as a random access memory (RAM) for temporarily storing required data, scratchpad memory, received packet data, packet data to be transmitted, and the like. A separate, removable SIM (not shown) can be provided as well, the SIM storing, for example, a preferred Public Land Mobile Network (PLMN) list and other subscriber-related information. The ROM is assumed, for the purposes of this invention, to store a program enabling the MCU 120 to execute the software routines, layers and protocols required to implement the methods in accordance with these teachings, and may as well provide a suitable user interface (UI), via display 140 and keypad 160, with a user. Although not shown, a microphone and speaker are typically provided for enabling the user to conduct voice calls in a conventional manner.

The mobile station 100 also contains a wireless section that includes a digital signal processor (DSP) 180, or equivalent high speed processor or logic, as well as a wireless transceiver that includes a transmitter 200 and a receiver 220, both of which are coupled to an antenna 240 for communication with the network operator. At least one local oscillator (LO) 260, such as a frequency synthesizer, is provided for tuning the transceiver. Data, such as digitized voice and packet data, is transmitted and received through the antenna 240.

For the purposes of this description the MS 100 is assumed to be MBMS compatible and MBMS enabled, and MBMS traffic is assumed to be received through the antenna 240 in accordance with the teachings of this invention. For example, the MS 100 may receive via the MBMS traffic a video/audio clip provided by the video feed to the MBMS block 60, and may then display the resulting video on the display 140 and play the audio through a MS speaker.

For a given MBMS service the network 10 must allocate a sufficient number of radio blocks to fulfill the bit rate requirements of the given service. In the case of a low bit rate MBMS service, for example where text-based information is transmitted with a low repetition rate, it is sufficient to allocate blocks only infrequently. On the other hand, and in the case of video/audio clips, one physical channel may not provide a sufficiently high data rate, and multislot allocation is required.

From the MS 100 power consumption point of view it is significantly better to allocate several time slots in parallel and to thus increase the duration of an idle period between the blocks, as compared to allocating one time slot continuously for the MBMS service, as was shown in FIG. 3. Assuming that the MS 100 is informed by the network 10 of block periods where it is to expect the MBMS data, the MS 100 can switch to an operational mode where power consumption is reduced, and then return to the normal (fully powered) operational mode to receive the next allocated blocks. This mode of operation is not possible if only one time slot is allocated continuously, as in FIG. 3, and the MS 100 must receive and decode every block on the given physical channel.

For the purposes of this invention, the MS 100 is assumed to store within the memory 130 data that indicates the MBMS multislot operational parameters that are allocated by some suitable MBMS control function 60A in the network 10 and transmitted to the MS 100 using appropriate signalling message(s). The MBMS multislot operational parameters (MMOP) data is indicated generally as the region of memory 130 designed 135. The network MBMS control function 60A could be one that resides in the MBMS block 60, or in or with another controller associated with the Radio Access Network (RAN) function and/or the Radio Link Control/Medium Access Control (RLC/MAC) function of the network 10.

Reference with regard to the overall operation of the wireless communications system 5 may be had to, for example: 3GPP TS 44.018, V5.3.0(2002-01) Technical Specification, $3^{rd}$ Generation Partnership Project; Technical Specification Group GSM EDGE Radio Access Network; Mobile radio interface layer 3 specification; Radio Resource Control Protocol (Release 5); 3GPP TS 05.02, V8.10.0 (2001-08) Technical Specification, $3^{rd}$ Generation Partnership Project; Technical Specification Group GSM EDGE Radio Access Network; Multiplexing and multiple access on the radio path (Release 1999); and to ETSI TS 144 060, V4.1.0 (2001-04) Technical Specification, Digital cellular telecommunications system (Phase 2+); General Packet Radio Service (GPRS); Mobile Station (MS)—Base Station System BSS) interface; Radio Link Control/Medium Access Control (RLC/MAC) protocol (3GPP TS 44.060 version 4.1.0 Release 4). The foregoing descriptions of the network operation are preferably modified so as to incorporate the MBMS-related teachings of this invention.

Figure 4:
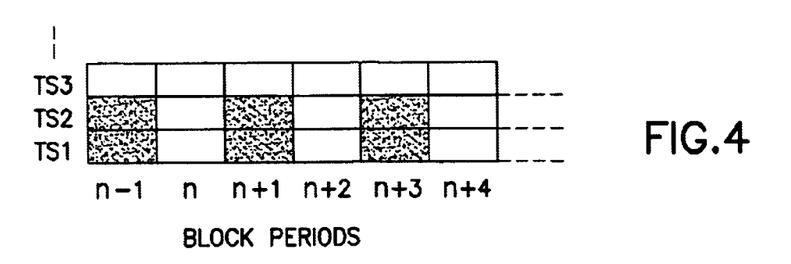
FIG. 4 shows, in accordance with an embodiment of this invention, a two time slot physical channel allocation, where every second block is allocated for receiving MBMS traffic.

FIG. 3, already discussed, shows a first multislot allocation policy wherein all blocks of one physical channel are allocated for MBMS traffic. FIG. 4 illustrates, in accordance with an aspect of this invention, how the same bit rate can be provided by allocating two time slots during every second block period for the MBMS service. This allows the MS 100 to switch to the lower power consumption mode in every second block period (four frames in duration).

Referring now to a first MBMS allocation method, i.e., a MBMS channel with predefined bit rate, the method allocates blocks for the MBMS channel by defining transmission periods based on the bit rate requirement and the defined multislot class of the MS 100. Note that for the typical plurality of MSs 100 that receive a MBMS broadcast what is considered is a minimum multislot class of the plurality of mobile stations. For example, one MS 100 could be capable of three slot reception, another capable of four slot reception, and another capable of only two slot reception. Assuming that all mobile stations supporting a specific MBMS service (e.g., video broadcasting) are required to support, for example, at least two time slot reception, the network 10 calculates the number of required radio blocks per defined time period in order to comply with the bit rate requirements. The calculated radio blocks are then allocated to the MS 100 in such a manner way that the MS 100 is permitted to not receive blocks during some period between the periods when MBMS reception must occur. It is beneficial to make these non-receiving periods as long as possible so as to maximize the MS 100 power consumption reduction, and/or to provide the MS 100 with sufficient time to perform other functions, such as to make neighbor cell measurements and report these measurements back to the network.

Figure 5:
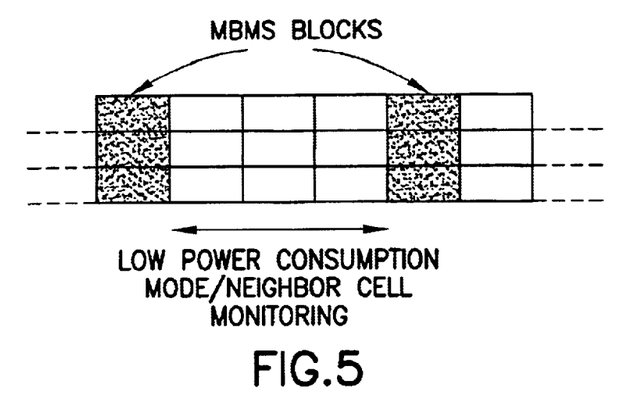
FIG. 5 depicts the gain resulting from multislot MBMS channel allocation.
Figure 6:
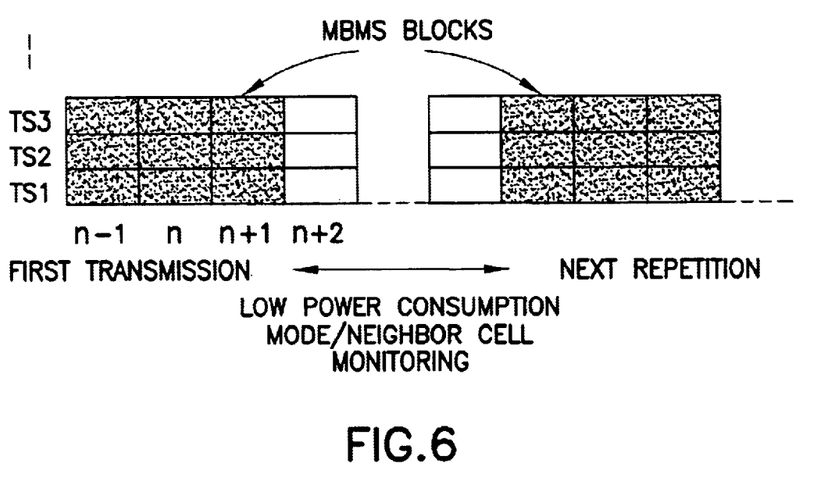
FIG. 6 illustrates a second multislot allocation method of this invention.

For example, assume that the MBMS service is broadcast in an area where the carrier to interference (C/I) ratio is low, and for this reason CS1 (strongest) channel coding is used. This yields an exemplary bit rate of 8 kbit/sec on a PDCH. Assuming the MBMS service of interest requires 8 kbit/s and the MS 100 is required to support reception of three time slots, the desired allocation of blocks is three channels in parallel, and every third block period is designated for MBMS transmission from the network 10, as is shown in FIG. 5. The MS 100 is informed of this particular allocation via suitable signalling, stores the required data in the MMOP memory region 135, and then receives and decodes the defined MBMS blocks for as long as the user desires to receive the MBMS service (e.g., a video/audio clip). During the intervening unused blocks the MS 100 is enabled to lower its power consumption by entering the sleep mode, or it can perform neighbor cell monitoring or some other task.

In accordance with another method, one that maximizes the sleep time of the mobile station 100, if the MBMS broadcasting is performed infrequently it may be advantageous to transmit all of the information regarding one MBMS message (e.g., one video clip, or one news alert) within some minimum amount of time. This method then transmits the MBMS data with the maximum number of time slots that the MS 100 is required to support in subsequent block periods until the entire MBMS message has been transferred. This allows the MS 100 to switch to the lower power consumption mode for the maximum amount of time. For example, the MS 100 could receive the MBMS transmission and then enter the sleep mode for a relatively long period of time (e.g., hundreds of milliseconds or several seconds), and wake up to receive a next indicated block where a MBMS message could arrive.

It should be kept in mind that MBMS is a broadcast service, and thus there may a number of mobile stations that are all operated with the same multislot parameters so as to simultaneously receive the same MBMS broadcast transmission (e.g., a news alert that includes a video/audio clip).

The MS 100 is informed by suitable signaling of which block periods are used for MBMS transmissions. This can be done, for example, by broadcasting in system information messages the block periods where the MBMS message(s) are carried, or alternatively by broadcasting information that identifies a block containing the MBMS service allocations.

In either case the designated MBMS allocation of block periods are received and stored in the MMOP region 135 of the MS memory 130. Similar scheduling mechanisms as currently used for the CBCH can also be employed for this purpose.

It should be noted that the radio block allocation need not be constant for the entire duration of the transmission of a MBMS message. For example, if the network 10 determines that radio channel conditions have changed such that either a stronger coding or a less strong coding can be used, thereby enabling a change to be made in the required bit rate, a resulting reallocation of radio blocks can occur as a consequence, and information concerning the reallocation of radio blocks is then signaled to the MS 100 in some suitable manner. As an example, if the C/I is initially low but is detected to have improved during the MBMS broadcast, it may be possible for the network 10 to change from the radio block allocation scheme as shown in FIG. 4 to the one shown in FIG. 5, thereby increasing the number of idle radio blocks between active radio blocks and further decreasing the MS 100 power consumption. That is, the radio block allocation can be made adaptive based on radio channel conditions and/or on some other criteria.

Figure 8:
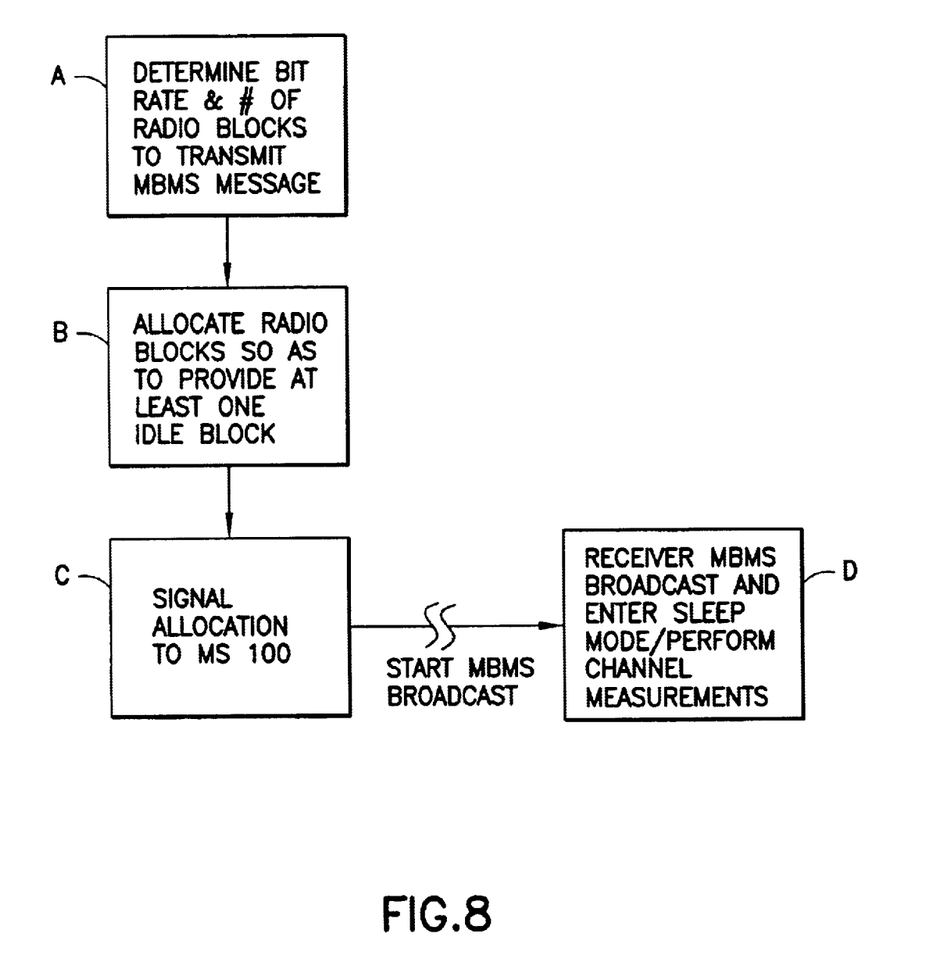
FIG. 8 is a logic flow diagram in accordance with a method of this invention.

Referring now to FIG. 8, in accordance with a method of this invention for operating the wireless telecommunication system 5 for providing a MBMS broadcast transmission from the network operator 10 to the mobile station 100, the method at Step A determines a minimum bit rate requirement to broadcast a MBMS message and a number of radio blocks per time period that are required to satisfy the bit rate requirement. With regard to this step it is noted that the operator may determine the frequency at which MBMS messages are broadcast. Based on the size of the MBMS message(s) the number of radio blocks that are required per unit of time can be determined (what bit rate is required to support the MBMS service). At Step B the method allocates the determined number of radio blocks in accordance with a multislot transmission technique, wherein a plurality of time slots are used per frame, such that the mobile station 100 is provided with at least one idle radio block between two active transmission periods. The at least one idle radio block may occur between two active (MBMS) radio blocks. At Step C the network transmits the determined radio block allocation to the mobile station 100.

In the preferred embodiment the step of determining includes a consideration of radio channel conditions and a multislot class of the mobile station.

In one embodiment the step of allocating attempts to maximize the number of idle radio blocks and the mobile station 100, in response to an occurrence of the at least one idle radio block, performs at least one of entering a reduced power consumption mode of operation during the at least one idle radio block or entering a neighbor channel measurement mode of operation during the at least one idle radio block (Step D).

In another embodiment the step of allocating allocates radio blocks so as to complete the data transmission within the shortest period of time.

While described above in the context of the MBMS service where it may be required to transmit a substantially continuous stream of data (e.g., video data) for MS reception and substantially real-time display, it should be appreciated that this invention may find utility in other applications and services wherein it is desired to broadcast (point to multipoint) or to otherwise transmit (point to point) a substantially continuous stream of information to a power limited terminal.

The teachings of this invention are also not intended to be limited to any of the specifically described air interface standards or protocols, frame or block structures or formats, bit rates, or block allocations, nor is it intended to limit the practice of this invention to only a wireless telecommunications system of a type shown in the block diagram of FIG. 7.

What is claimed is:

1. A method for transmitting data to a mobile station, comprising:

determining a minimum bit rate requirement to transmit the data to the mobile station;

determining a number of radio blocks per time period that are required to satisfy the determined minimum bit rate requirement, where each radio block comprises a plurality of time slots; and allocating at least the determined number of radio blocks required to satisfy the determined minimum bit rate requirement in accordance with a multislot transmission technique such that radio blocks allocated to the mobile station during an active transmission period each contain a plurality of time slots that are allocated to the mobile station, and such that the mobile station is provided with at least one idle radio block between two active transmission periods.

2. A method as in claim 1, where the step of determining the minimum bit rate requirement comprises a consideration of radio channel conditions.

3. A method as in claim 1, where the data comprises video data.

4. A method as in claim 1, where the data is transmitted as a Multimedia Broadcast/Multicast Service MBMS broadcast transmission.

5. A method as in claim 1, where the mobile station enters a reduced power consumption mode of operation during the at least one idle radio block.

6. A method as in claim 1, where the mobile station enters a neighbor cell measurement mode of operation during the at least one idle radio block.

7. A method as in claim 1, where the step of allocating operates to allocate radio blocks so as to transmit the data in subsequent radio block periods using a maximum number of time slots that the mobile station is required to support until an entire message has been transferred so as to maximize a number of idle radio blocks between two active transmission periods.

8. A method as in claim 1, where the step of allocating comprises signaling the mobile station to identify the radio block allocation.

9. A method to transmit data to a mobile station, comprising:

determining a minimum bit rate requirement to transmit the data to the mobile station;

determining a number of radio blocks per time period that are required to satisfy the bit rate requirement; and allocating the determined number of radio blocks in accordance with a multislot transmission technique, wherein a plurality of time slots are used per frame, such that the mobile station is provided with at least one idle radio block between two active transmission periods, where determining the number of radio blocks comprises considering a minimum multislot class of a plurality of mobile stations receiving the transmitted data.

10. A wireless telecommunication system comprising a network component and at least one mobile station, said network component comprising control means for determining a minimum bit rate requirement to transmit data to the mobile station and for determining a number of radio blocks per time period that are required to satisfy the determined minimum bit rate requirement, where each radio block comprises a plurality of time slots, said control means further operating for allocating at least the determined number of radio blocks required to satisfy the determined minimum bit rate requirement in accordance with a multislot transmission technique, such that radio blocks allocated to the mobile station during an active transmission period each contain a plurality of time slots that are allocated to the mobile station, and such that the mobile station is provided with at least one idle radio block between two active transmission periods.

11. A wireless telecommunication system as in claim 10, where said control means, when determining the minimum bit rate requirement, considers radio channel conditions.

12. A wireless telecommunication system as in claim 10, where the data comprises video data.

13. A wireless telecommunication system as in claim 10, where the data is transmitted as a Multimedia Broadcast/Multicast Service MBMS broadcast transmission.

14. A wireless telecommunication system as in claim 10, where said mobile station is responsive to an occurrence of said at least one idle radio block for entering a reduced power consumption mode of operation.

15. A wireless telecommunication system as in claim 10, where said mobile station is responsive to an occurrence of said at least one idle radio block for entering a neighbor cell measurement mode of operation.

16. A wireless telecommunication system as in claim 10, where said control means, when allocating the determined number of radio blocks, operates to allocate the radio blocks so as to transmit the data in subsequent radio block periods using a maximum number of time slots that the mobile station is required to support until an entire message has been transferred so as to maximize a number of idle radio blocks between two active transmission periods.

17. A wireless telecommunication system as in claim 10, where said control means further operates to signal said mobile station to identify the radio block allocation, and where said mobile station stores the signaled radio block allocation in a mobile station memory.

18. A wireless telecommunication system comprising a network component and at least one mobile station, said network component comprising control means for determining a minimum bit rate requirement to transmit data to the mobile station and for determining a number of radio blocks per time period that are required to satisfy the bit rate requirement, said control means further operating for allocating the determined number of radio blocks in accordance with a multislot transmission technique, wherein a plurality of time slots are used per frame, such that the mobile station is provided with at least one idle radio block between two active transmission periods, where said control means, when determining the number of radio blocks, considers a minimum multislot class of a plurality of mobile stations receiving the transmitted data.

19. A method for operating a wireless telecommunication system comprising a network operator and at least one mobile station for providing a Multimedia Broadcast/Multicast Service MBMS broadcast transmission from said network operator to said mobile station: comprising:

determining a minimum bit rate requirement to broadcast a MBMS message and a number of radio blocks per time period that are required to satisfy the determined minimum bit rate requirement, where each radio block comprises a plurality of time slots;

allocating at least the determined number of radio blocks required to satisfy the determined minimum bit rate requirement in accordance with a multislot transmission technique, such that radio blocks allocated to the mobile station during an active transmission period each contain a plurality of time slots that are allocated to the mobile station, and such that the mobile station is provided with at least one idle radio block between two active transmission periods; and transmitting the determined radio block allocation to said mobile station.

20. A method to operate a wireless telecommunication system comprising a network operator and at least one mobile station for providing a Multimedia Broadcast/Multicast Service MBMS broadcast transmission from said network operator to said mobile station: comprising:

determining a minimum bit rate requirement to broadcast a MBMS message and a number of radio blocks per time period that are required to satisfy the bit rate requirement;

allocating the determined number of radio blocks in accordance with a multislot transmission technique, wherein a plurality of time slots are used per frame, such that said mobile station is provided with at least one idle radio block between two active transmission periods; and transmitting the determined radio block allocation to said mobile station, where determining comprises a consideration of radio channel conditions and a minimum multislot class of a plurality of mobile stations receiving the broadcast MBMS message.

21. A method to operate a wireless telecommunication system comprising a network operator and at least one mobile station for providing a Multimedia Broadcast/Multicast Service MBMS broadcast transmission from said network operator to said mobile station: comprising:

determining a minimum bit rate requirement to broadcast a MBMS message and a number of radio blocks per time period that are required to satisfy the bit rate requirement;

allocating the determined number of radio blocks in accordance with a multislot transmission technique, wherein a plurality of time slots are used per frame, such that said mobile station is provided with at least one idle radio block between two active transmission periods; and transmitting the determined radio block allocation to said mobile station, where allocating comprises maximizing the number of idle radio blocks, and where said mobile station, in response to an occurrence of the at least one idle radio block, performs at least one of entering a reduced power consumption mode of operation during the at least one idle radio block, or entering a neighbor channel measurement mode of operation during the at least one idle radio block.

22. A method as in claim 19, where the step of allocating operates to allocate radio blocks so as to transmit the data in subsequent radio block periods using a maximum number of time slots that the mobile station is required to support until an entire message has been transferred so as to maximize a number of idle radio blocks between two active transmission periods.

23. A method for operating a wireless telecommunication system comprising a network operator and at least one mobile station for providing a Multimedia Broadcast/ Multicast Service MBMS broadcast transmission from said network operator to said mobile station: comprising:

determining a number of MBMS radio blocks that are required to satisfy a minimum bit rate requirement for the MBMS broadcast transmission, where each MBMS radio block comprises a plurality of time slots;

allocating the determined number of MBMS radio blocks in accordance with a multislot transmission technique that assigns a plurality of time slots per TDMA frame for transmitting a MBMS broadcast message such that there is at least one idle radio block between two active MBMS transmission periods;

transmitting information that describes the TDMA time slot assignment to said mobile station; and during reception of the broadcast MBMS message by said mobile station, entering a reduced power consumption mode of operation during the at least one idle radio block.

24. A method for operating a wireless telecommunication system comprising a network operator and at least one mobile station for providing a Multimedia Broadcast/ Multicast Service MBMS broadcast transmission from said network operator to said mobile station: comprising:

determining a number of MBMS radio blocks that are required to satisfy a minimum bit rate requirement for the MBMS broadcast transmission, where each MBMS radio block comprises a plurality of time slots;

allocating the determined number of MBMS radio blocks in accordance with a multislot transmission technique that assigns a plurality of time slots per TDMA frame for transmitting a MBMS broadcast message such that there is at least one idle radio block between two active MBMS transmission periods;

transmitting information that describes the TDMA time slot assignment to said mobile station; and during reception of the broadcast MBMS message by said mobile station, performing a neighbor cell measurement operation during the at least one idle radio block.

25. A method for operating a wireless telecommunication system comprising a network operator and at least one mobile station for providing a Multimedia Broadcast/ Multicast Service MBMS broadcast transmission from said network operator to said mobile station: comprising:

determining a number of MBMS radio blocks that are required to satisfy a minimum bit rate requirement for the MBMS broadcast transmission, where each MBMS radio block comprises a plurality of time slots; and allocating the determined number of MBMS radio blocks in accordance with a multislot transmission technique that assigns a plurality of time slots per TDMA frame for transmitting a MBMS broadcast message such that there is at least one idle radio block between two MBMS radio blocks.

26. A mobile station operable in a wireless telecommunication system comprising a network operator providing a Multimedia Broadcast/Multicast Service MBMS broadcast transmission service, said mobile station comprising a radio frequency transceiver and a memory coupled to a data processor, said data processor being responsive to an assignment of MBMS radio blocks received through said radio frequency transceiver for storing the assignment in said memory, where each MBMS radio block comprises a plurality of time slots and the MBMS radio blocks being assigned in accordance with a multislot technique so that when a MBMS broadcast message is transmitted to said mobile station there is at least one idle radio block following an active MBMS transmission period, said data processor being responsive to the stored assignment, during reception of the broadcast MBMS message by said mobile station, for performing at least one of a neighbor cell measurement operation during the at least one idle radio block, or for entering a reduced power consumption mode of operation during the at least one idle radio block.

* * * * *